239-165 SR
2/4/86 OR H 000,023

United States Statutory Invention Registration [19]

[11] Reg. Number: H23
[45] Published: Feb. 4, 1986

Riester et al.

[54] DUST CONTROL ON LONG WALL SHEARING MACHINES

[76] Inventors: John B. Riester, 565 Westwood St., Morgantown, W. Va. 26595; David M. Miller, Rte. 1, Box 151, Metz, W. Va. 26585; Lloyd E. Postlethwait, 310 Marshall St., Fairmont, W. Va. 26554

[21] Appl. No.: 669,129

[22] Filed: Nov. 7, 1984

[51] Int. Cl.[4] ..... B05B 1/20; E21C 35/20
[52] U.S. Cl. ..... 239/165; 98/50; 239/288; 239/587; 299/12; 299/43

*Primary Examiner*—Thomas H. Tarcza
*Assistant Examiner*—Linda J. Wallace

[57] ABSTRACT

An improved dust control apparatus for a shearing machine which has attached thereto a spray bar apparatus mounted to and extended from said shearing machine and containing a curtain for dust control and a plurality of spray heads along said spray bar, an improvement in the spray bar apparatus is provided by mounting an extendable spray bar to said spray bar with a hydraulic cylinder attached to said extendable spray bar so that it can be extended or retracted as said shearing machine reaches the end of its cut so that said extendable portion is not damaged when the shearing machine reaches the end of its cut. The extendable portion includes spray heads and a curtain for dust control purposes.

1 Claim, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

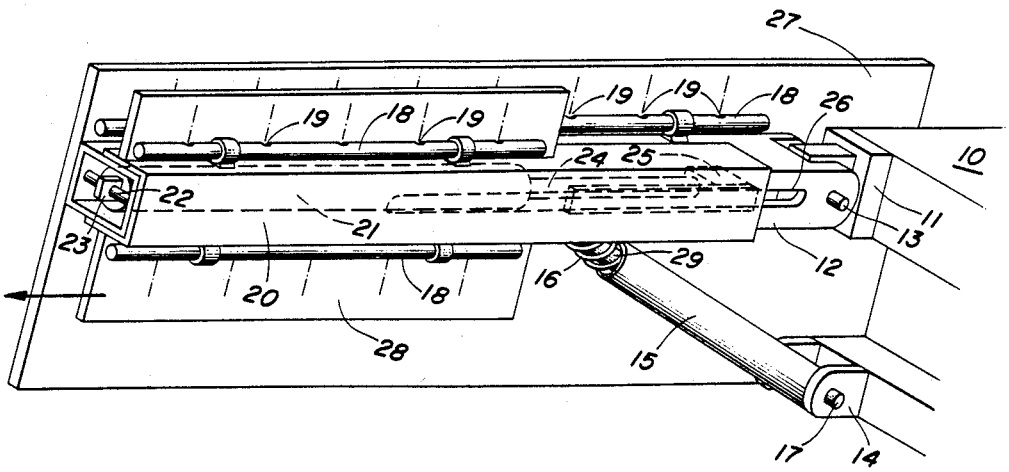

DUST CONTROL ON LONG WALL SHEARING MACHINES

PRIOR ART

U.S. Pat. No. 4,358,160 is the closest known prior art to this invention and discloses a spray bar mounted to a long wall shearing machine. The patent further includes a hanging curtain to confine the dust to the side being cut and away from the operator.

BRIEF DESCRIPTION OF THE INVENTION

This invention discloses an improvement on U.S. Pat. No. 4,358,160 by extending the spray bar a substantial distance further than the above-referenced spray bar by providing a hydraulic control system which extends the bar until the wall at the end of the cut is reached, at which time the extended portion of the spray bar is retracted so that it will not be damaged by impact against the wall.

DETAILED DESCRIPTION OF THE INVENTION

Figure 1:
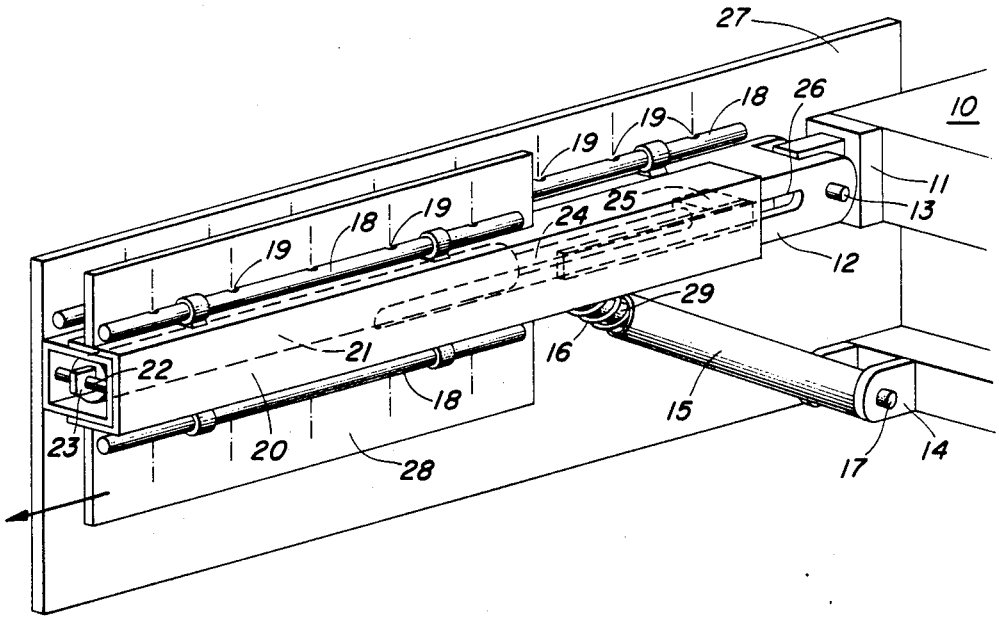
FIG. 1 is an orthogonal projection of an extended spray bar in the retracted position and FIG. 2 is a modification of the apparatus illustrating a spray bar in the extended portion.
Figure 2:
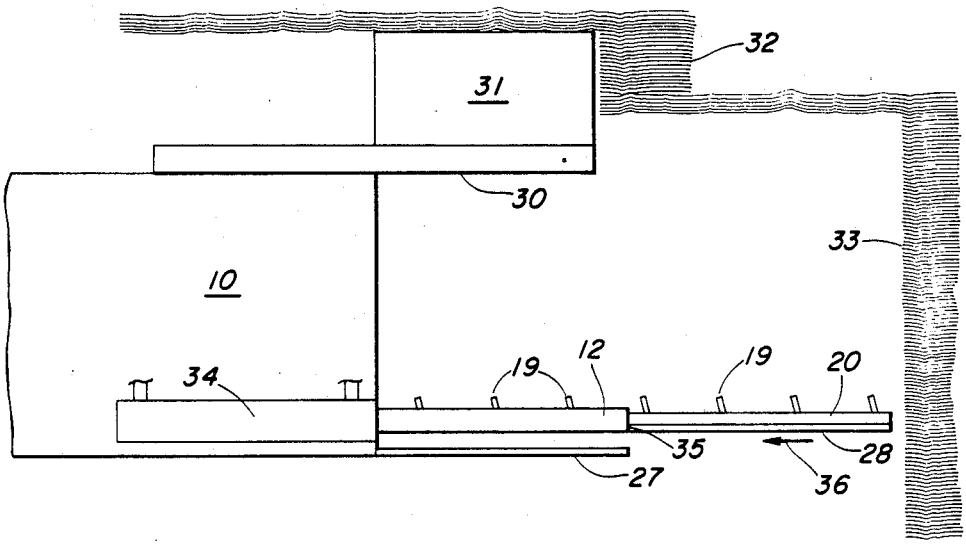

Referring to both FIGS. 1 and 2, a shearing machine 10 has attached thereto a mount 11. A spray bar 12 is attached to mount 11 through a pin 13. The spray bar is supported on its underside by a mount 14 attached to shearing machine 10 with a spring housing 15 containing spring 16 around shaft 29, which shaft 29 is attached to the underside of spray bar 12 by a pivot (not shown). Spring housing 15 is attached to mount 14 by pin 17. A spray tube 18 is attached to spray bar 12 and contains a plurality of spray openings 19 which permit the exit of water in the form of spray. It is obvious, of course, that a nozzle can be attached to openings 19 which nozzle can be directed in any particular direction in order to better alleviate dust control. The extendable portion of spray bar 12 is a channel member 20 mounted around spray bar 12 so that it can slide axially along spray bar 12. A hydraulic cylinder 21 (shown by dotted lines) is mounted on the inside of spray bar 12 and attached to spray bar 12 at one end and through a pin 22 to the inside of spray bar 12 through a mount 23 which is attached to hydraulic cylinder 21. The other end of hydraulic cylinder 21 comprises attached to the piston which is inside hydraulic cylinder 21 and not illustrated. At the end of shaft 24 is a cross member 25 which passes through a slot 26 and is attached to the inside channel member 20. A curtain 27 is attached to the back portion of spray bar 12 and a second curtain 28 is attached to the top and bottom of channel member 20 so that, when channel member 20 is extended, the curtain protection will, likewise, be extended.

Referring to FIG. 2, identical numbers will be used for the same elements. In FIG. 2 a shearing machine 10 has a drum mount 30 attached to shearing machine 10 and has a cutting drum 31 rotatably mounted thereon. Drum 31 is illustrated as cutting into a source of mineral, such as coal 32. The end of the cut is illustrated as wall 33. At this point it should be noted that spray bar 12 terminates at point 35 which does not extend past the cutting edge of drum 31. Thus, as shearing machine 10 progresses toward wall 33, spray bar 12 will stop prior to the point where it reaches wall 33. In FIG. 2, a slight modification is shown to extend and retract spray bar channel member 20 and essentially comprises a hydraulic cylinder 34, which has its piston rod coupled to channel member 20. Thus as shearing machine 10 approaches wall 33, hydraulic cylinder 34 which is coupled to channel member 20 can retract channel member 20. Mounted above and below channel member 20, is a plurality of spray tubes 18, each having a plurality of spray openings 19.

OPERATION

The apparatus of FIGS. 1 and 2 operate as follows:

As soon as shearing machine 10 moves sufficiently far from wall 33, channel member 10 is extended by hydraulic cylinder 21 as shown in FIG. 1 or hydraulic cylinder as shown in FIG. 2 whereupon channel member 20 is extended so that the spray head or openings 19 are extended well past the cutting drum 31. Furthermore, curtains 27 and 28 provide dust control well past cutting durm 31. It is obvious as shearing machine 10 moves away from wall 33 that the channel member 20 will remain extended throughout the full length of the cut. Once shearing machine 10 reverses direction and approaches wall 33, then channel member 20 must be retracted in order to protect it from damage caused by impact against wall 33. In order to retract channel member 20, hydraulic cylinder 21 is energized causing pressure to push cylinder 24 in the direction of arrow 36 (see FIG. 2). Not only is channel member 20, being retracted, but the spray opening 19 and curtain 28. It is obvious, of course, that channel member 20 can be retracted fully at one time or gradually as it approaches wall 33.

CONCLUSIONS

Two methods for extending and retracting channel member 20 have been illustrated. It is obvious that other methods can be used which will be fully within the spirit and scope of the invention as described in the specificaion and appended claim.

We claim:

1. In an apparatus for providing additional dust control for a shearing machine which has a spray bar attached to the shearing machine, and spray bar having a plurality of openings for ejecting fluid spray, an improvement comprising an extendable spray bar, means for slidably attaching said extendable bar to said spray bar, means for extending and retracting said extendable spray bar, and curtain means attached to said extendable spray bar, said extendable spray bar including additional spray heads.

* * * * *